United States Patent
Tokutake et al.

(10) Patent No.: US 6,585,561 B2
(45) Date of Patent: Jul. 1, 2003

(54) METHOD OF TEACHING POSITION

(75) Inventors: Hideo Tokutake, Nagano (JP); Tatsuo Niimura, Nagano (JP)

(73) Assignee: Kabushiki Kaisha Koyama, Nagano (JP)

( * ) Notice: Subject to any disclaimer, the term of this patent is extended or adjusted under 35 U.S.C. 154(b) by 0 days.

(21) Appl. No.: 09/924,213

(22) Filed: Aug. 8, 2001

(65) Prior Publication Data

US 2003/0032365 A1 Feb. 13, 2003

(51) Int. Cl.$^7$ .............................................. B24B 49/00
(52) U.S. Cl. ................... 451/5; 451/8; 451/11
(58) Field of Search ............. 451/5, 8, 10, 11; 318/568.13

(56) References Cited

U.S. PATENT DOCUMENTS

| | | | | |
|---|---|---|---|---|
| 4,570,385 A | * | 2/1986 | Richter et al. | 409/290 |
| 4,603,511 A | | 8/1986 | Komatsu et al. | |
| 4,886,529 A | * | 12/1989 | Hashimoto et al. | 451/14 |
| 4,984,175 A | * | 1/1991 | Toyoda et al. | 700/261 |
| 5,051,675 A | * | 9/1991 | Okumura et al. | 318/568.1 |
| 5,103,149 A | * | 4/1992 | Kimura et al. | 318/568.1 |
| 5,509,847 A | * | 4/1996 | Jinno et al. | 451/11 |
| 5,798,627 A | * | 8/1998 | Gilliland et al. | 318/568.13 |
| 6,222,338 B1 | * | 4/2001 | Villaret | 318/567 |
| 6,356,807 B1 | * | 3/2002 | McGee et al. | 29/407.04 |

FOREIGN PATENT DOCUMENTS

| | | |
|---|---|---|
| DE | 19631753 | 2/1998 |
| EP | 0333874 | 9/1989 |
| JP | 11254286 | 9/1999 |

* cited by examiner

Primary Examiner—M. Rachuba
(74) Attorney, Agent, or Firm—Jordan and Hamburg LLP

(57) ABSTRACT

An object of the present invention is to provide a method of teaching a position, in which greater loads are not applied to a workpiece, a machining tool and a mechanism for moving the workpiece. The method is characterized by the steps of: driving the motors with detecting exciting currents so as to move the workpiece from a position short of an object position to the object position; making the workpiece contact with the machining tool corresponding to the object position; temporally turning off the exciting currents of the all motors if at least one of the exciting currents is greater than a predetermined value; and storing a position of the workpiece as the object position if counter forces, which work from the machining tool to the arms and the motors, and frictional forces, which are generated in the arms and the motors, are balanced when the exciting currents are turned off and the workpiece is made contact with the machining tool.

8 Claims, 7 Drawing Sheets

METHOD OF TEACHING POSITION

BACKGROUND OF THE INVENTION

The present invention relates to a method of teaching a position, more precisely relates to a method of teaching a position, which can be applied to a finishing machine having a grind stone, especially a machine for removing flashes from a cast product.

A gate and flashes must be removed from a cast product, so many types of machines, which automatically remove gates and flashes of cast products, have been developed.

In one of the conventional automatic machines, a rotary grind stone is located at a predetermined position, and a workpiece (a cast product) is moved, by a driving mechanism including a plurality of linked arms, toward the rotary grind stone, so that the workpiece is made contact with the rotary grind stone so as to remove the gate and flashes from the workpiece.

In the conventional machine, a proper machining track of the workpiece is defined before the removing operation. Namely, the workpiece, which has been set in the machine, is moved so as to input positions of parts of the workpiece, which will be machined, in order, to the machine.

The parts to be machined are inputted or taught by two ways. One is manual teaching, in which the workpiece is manually moved; the other is machine teaching, in which the workpiece is moved by machine. The manual teaching or the machine teaching is selected on the basis of machining conditions.

In the case of the machine teaching, when the part of the workpiece contacts the machining tool, the workpiece is coercively moved unless an operator stops the machine, which moves the workpiece. By the coercive movement of the workpiece, great loads are applied to the workpiece, the machining tool, a holding unit for holding the machining tool, arms for moving the workpiece and motors, so that the members are highly damaged.

Even if the workpiece properly contacts the machining tool, the workpiece is pressed on the machining tool with a prescribed force, so the arms, which hold and move the workpiece, are deformed and backlashes are formed in the arms. By the mechanical deformation and backlashes, an actual position of the work piece is different from a calculated position thereof, which is calculated on the basis of detected data of angular-position sensors, which respectively include encoders and respectively provided to joints between the arms, and sizes of the joints. Therefore, it is impossible to correctly teach the parts to be machined as a machining track.

SUMMARY OF THE INVENTION

An object of the present invention is to provide a method of teaching a position, in which greater loads are not applied to a workpiece, a machining tool and a mechanism for moving the workpiece.

Another object of the present invention is to provide a method of correctly teaching a position.

To achieve the object, the method of teaching a position of the present invention has a following structure.

Namely, the method of teaching a position on a machining track in a machine comprising:

a first arm turning in a first horizontal plane;

a first motor for turning the first arm;

a second arm provided to a front end of the first arm, the second arm turning in a second horizontal plane;

a second motor for turning the second arm;

a holding unit for holding a workpiece, the holding unit provided to a front end of the second arm, the holding unit rotating about a vertical axis;

a third motor for rotating the holding unit; and a control unit controlling the motors to turn and rotate the first arm, the second arm and the holding unit, the control unit moving the workpiece to positions, which have been stored, so as to make a part of the workpiece contact with a machining tool, the method comprises the steps of:

driving the motors with detecting exciting currents, by the control unit, so as to move the workpiece from a position short of an object position to the object position;

making the workpiece contact with the machining tool, which corresponds to the object position;

temporally turning off the exciting currents of the all motors if at least one of the exciting currents, which respectively run through the motors, is greater than a predetermined value; and storing a position of the workpiece as the object position if counter forces, which work from the machining tool to the arms and the motors, and frictional forces, which are generated in the arms and the motors, are balanced when the exciting currents are turned off and the workpiece is made contact with the machining tool.

In the method of the present invention, since the exciting currents of the all motors are temporally turned off after the workpiece contacts the machining tool, the workpiece and the arms, which move the workpiece, can be slightly moved backward in a state, in which the workpiece contacts the machining tool. With this action, deformation formed in the arms can be removed or highly reduced. The position of the workpiece can be detected, on the basis of angular positions and length of the arms, in the state, in which the deformation in the arms have been removed or highly reduced, and the position can be inputted or taught as the object position. Unlike the conventional method in which the workpiece is held by deformed arms, the method of the present invention is capable of detecting and teaching the correct position of the workpiece.

When at least one of the exciting currents, which respectively run through the motors, is greater than the predetermined value, the exciting currents of the all motors are temporally turned off. Therefore, applying greater loads to the work piece, the machining tool and the arms can be prevented.

Even if an operator is involved in or pinched between the arms during the teaching operation, the exciting currents of the all motors are turned off when the arm or arms contact the operator. Therefore, the operator can be escaped from the arms by small force, so the teaching operation can be safely executed.

BRIEF DESCRIPTION OF THE DRAWINGS

Embodiments of the present invention will now be described by way of examples and with reference to the accompanying drawings, in which.

DETAILED DESCRIPTION OF THE PREFERRED EMBODIMENTS

Preferred embodiments of the present invention will now be described in detail with reference to the accompanying drawings.

A finishing machine, which removes flashes of cast products, will be explained as an example of the machine in which the method of the present invention is executed.

Figure 1:
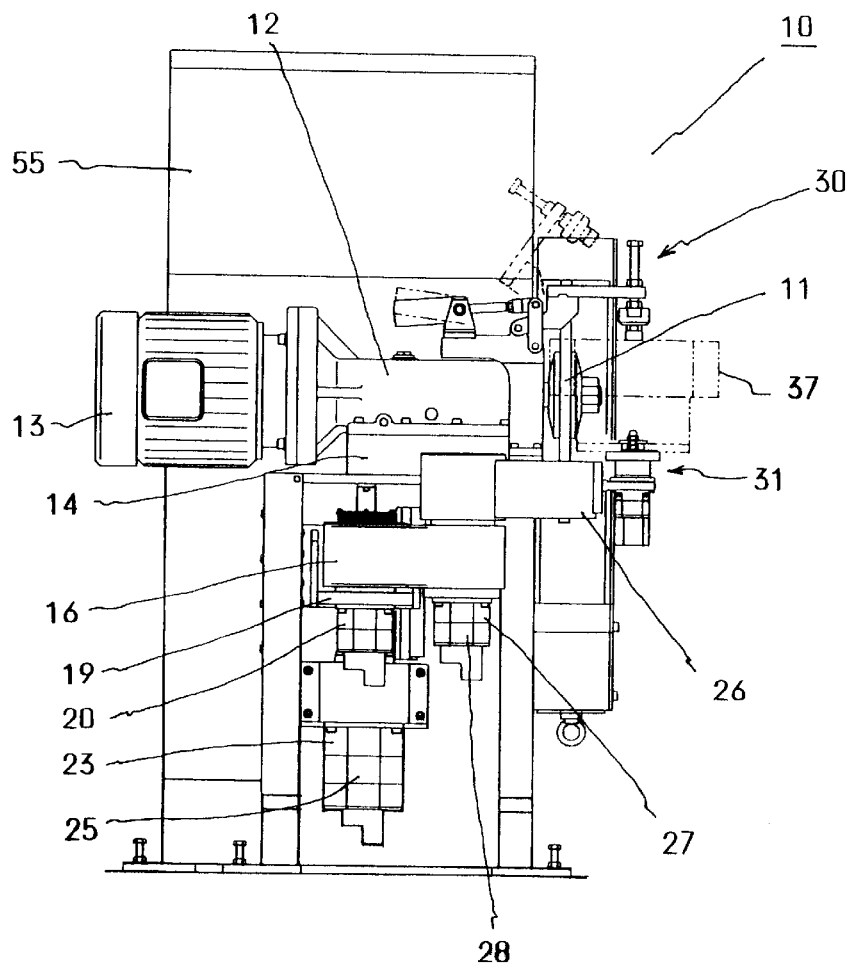
FIG. 1 is a front view of an example of a finishing machine capable of removing flashes of cast products.
Figure 2:
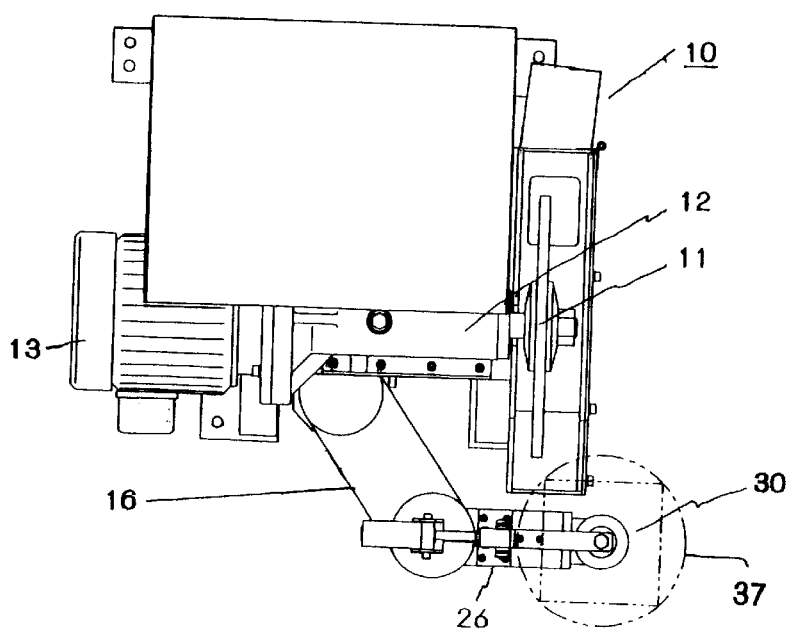
FIG. 2 is a plan view of the finishing machine shown in FIG. 1.

FIG. 1 shows a front view of the finishing machine 10; FIG. 2 shows a plan view thereof.

A machining tool 11 is a rotary grind stone. A shaft of the rotary grind stone 11 is rotatably held by a bearing 12. A motor 13 rotates the rotary grind stone 11. The rotary grind stone 11, the bearing 12 and the motor 13 are mounted on a base 14. An axial line of the rotary grind stone 11 is horizontally arranged.

Figure 3:
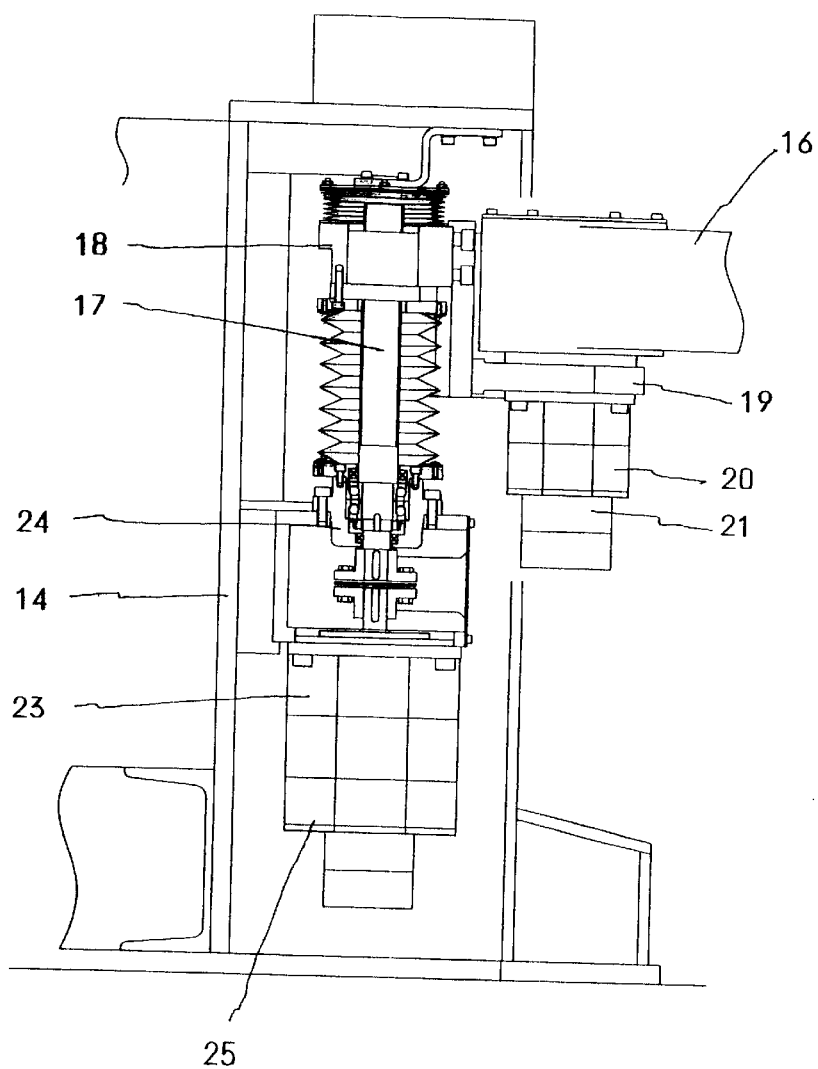
FIG. 3 is an explanation view of means for vertically moving a first arm.

A base end of a first arm 16 is pivotably attached to the base 14. The first arm 16 can be turned, in a horizontal plane, on a front side of the base 14. The first arm 16 is vertically moved by moving means. As clearly shown in FIG. 3, a base end of the first arm 16 is fixed to a stay 19, which is formed into an L-shape. The stay 19 is fixed to a moving member 18, which is vertically moved by a ball screw 17. A first motor 20 is fixed on a bottom face of the stay 19. A motor shaft (a first shaft) of the motor 20, which is not shown, is upwardly extended and pierced through the stay 19. The first arm 16 is fixed to the first shaft, so that the first arm 16 can be turned in a horizontal plane.

Both sides of the stay 19 are vertically guided by proper guide members (not shown). With this structure, the stay 19 is allowed to move in the vertical direction but not allowed to rotate about the ball screw 17.

An encoder (a first position sensor) 21 is provided to the motor 20 so as to detect an angular position of the first arm 16 with respect to a standard position.

A motor (a fourth motor) 24 is provided to the base 14 so as to rotate the ball screw 17. The ball screw 17 is rotatably held by a bearing 24. In the present embodiment, a lower end of the ball screw 17 is held by the bearing 24. Both ends of the ball screw 17 may be rotatably held by bearings.

An encoder (a fourth position sensor) 25 is provided to the motor 23 so as to detect an angular position of the ball screw 17. By detecting the angular position of the ball screw 17, height of the first arm 16 with respect to a standard position can be detected.

A second arm 26 is provided on a front end of the first arm 16 and capable of turning in a horizontal plane, which is parallel to the first arm 16.

A motor (a second motor) 27 is provided on a bottom face of the front end of the first arm 16. A motor shaft (a second shaft) of the motor 27, which is not shown, is upwardly extended and pierced through the first arm 16. A base end of the second arm 26 is fixed to the second shaft, so that the second arm 26 can be turned in the horizontal plane.

An encoder (a second position sensor) 28 is provided to the motor 27 so as to detect an angular position of the second arm 26 with respect to a standard position.

A holding unit 30, which is capable of holding a workpiece, is provided to a front end of the second arm 26.

Figure 4:
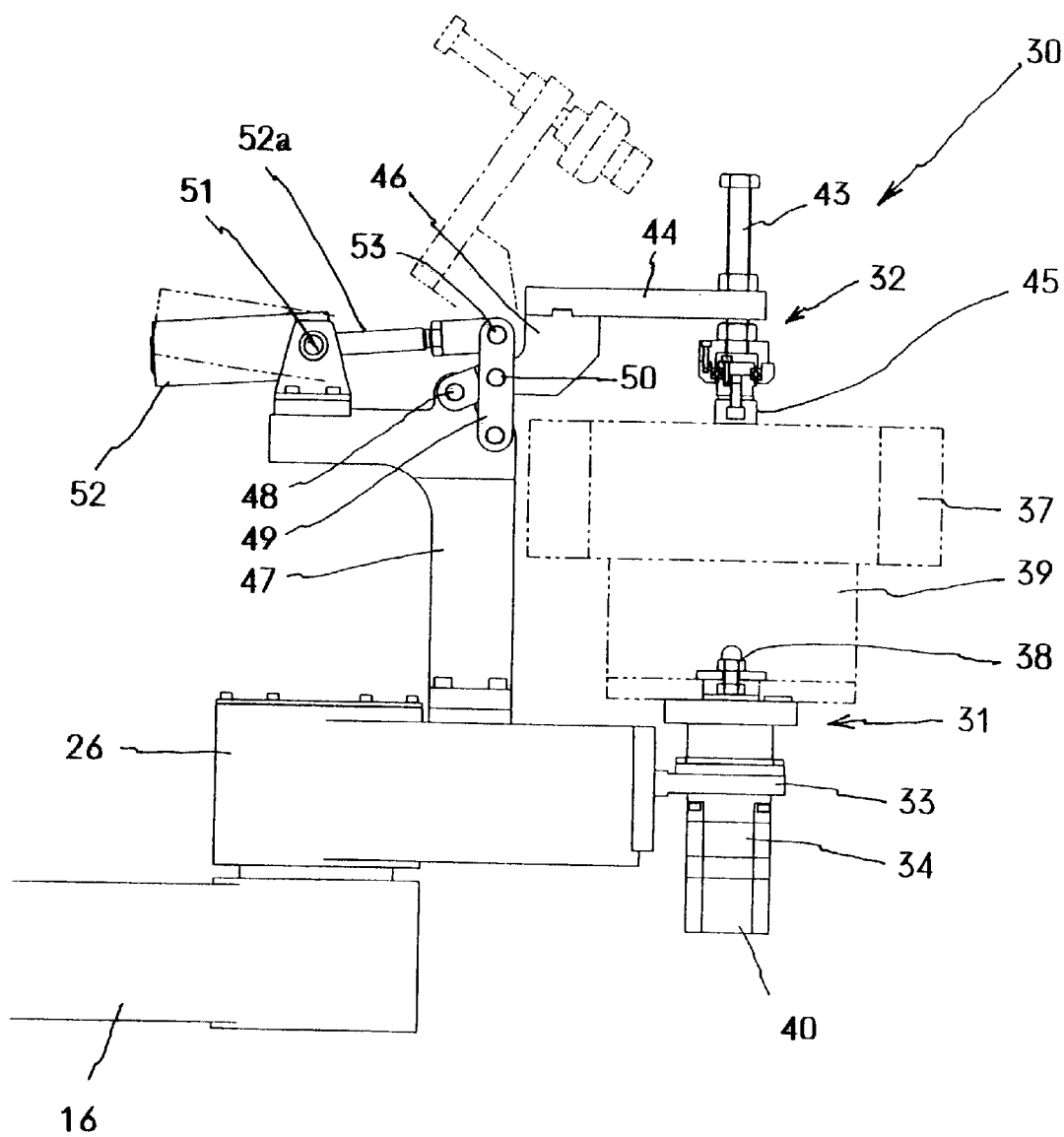
FIG. 4 is an explanation view of a holding unit.

The holding unit 30 will be explained with reference to FIG. 4.

The holding unit 30 includes a lower member 31 and an upper member 32.

The lower member 31 is attached to a stay 33, which is attached to the front end of the second arm 26.

A motor (a third motor) 34 is provided on a bottom face of the stay 33. A motor shaft (a third shaft) of the motor 34, which is not shown, is upwardly extended and pierced through the stay 33. The lower member 31 is fixed to the third shaft. An axial line of the third shaft perpendicularly crosses the horizontal plane, in which the second arm 26 is turned, namely the third shaft is arranged in the vertical direction. With this structure, the lower member 31 can be rotated, about the third shaft, in a horizontal plane parallel to the horizontal plane, in which the second arm 26 is turned.

A work holding jig 39 is detachably fixed to the lower member 31 by a bolt 38. By exchanging the jig 39, many types of workpiece s 37 can be held. An encoder (a third position sensor) 40 is provided to the motor 34 so as to detect an angular position of the workpiece 37 with respect to a standard position.

The workpiece 37 is clamped and held between the upper member 32 and the jig 39.

A press bolt 43 is pierced through a rotary plate 44, and height of the press bolt 43 with respect to the rotary plate 44 can be adjusted. Namely, the height with respect to the rotary plate 44 can be adjusted by loosening both nuts, which clamp the rotary plate 44. The height of the press bolt 43 can be fixed by tightly screwing the nuts.

A pressing member 45 is provided to a lower end of the press bolt 43 and capable rotating about an axial line of the press bolt 43.

The rotary plate 44 is fixed to an L-shaped member 46. A base end of the L-shaped member 46 is pivotably attached to a base 47, which is upwardly extended from the second arm 26, by a shaft 48. A mid part of a link 49, which constitute a toggle mechanism, is pivotably connected to a part of the L-shaped member 46 by a shaft 50. A front end of a cylinder rod 52a of a cylinder unit 52, whose base end is pivotably connected to the base 47 by a shaft 51, is pivotably connected to an upper end of the link 49 by a shaft 53. When the rod 52a of the cylinder unit 52 is extended, the rotary plate 44 is rotated in the clockwise direction in FIG. 4 and the workpiece 37 mounted on the jig 39 is tightly clamped between the. pressing member 45 and the jig 39. On the other hand, when the rod 52a of the cylinder unit 52 is retracted, the rotary plate 44 is upwardly moved to a position shown by dotted lines and the workpiece 37 can be exchanged.

The finishing machine 10 is controlled on the basis of programs, which include steps of machining workpiece s and which are stored in a control unit 55 shown in FIG. 1.

The control unit 55 controls the first motor 20, the second motor 27, the third motor 34 and the fourth motor 23 so as to vertically move the first arm 16, turn the first arm 16 and the second arm 26 and rotate the holding unit 30. Therefore, the workpiece 37, which is held by the holding unit 30, can be vertically moved, turned in a horizontal plane and rotated about an axial line, so that the workpiece 37 can be moved with respect to the rotary grind stone 11 so as to remove a gate, flashes, etc. of the workpiece (the cast product) 37.

In the present embodiment, as clearly shown in FIG. 2, the first arm 16 and the second arm 26 are moved in a space located on the front side of the base 14 as if they are extended from the base 14 and turned in the vicinity of the rotary grind stone 11. With this structure, a size of the finishing machine 10 can be smaller, and the finishing machine 10 can be effectively used in a narrow space. The work piece 37 can be automatically ground as if the workpiece 37 is manually ground by an operator standing in front of the rotary grind stone 11. This advantage is caused by attaching the first arm 16 to the base 14, which supports the rotary grind stone 11, and effectively using the space on the front side of the base 14. Unlike the conventional machine in which the machining tool is moved around the workpiece, a required space of the machine 10 of the present embodiment can be smaller, so that the machine 10 is capable of effectively using a space.

Successively, the method of teaching positions or a machining track and a control system of the finishing machine 10 will be explained.

In the present embodiment, to teach the machining track, the workpiece 37 is manually moved, by an operator, until reaching a position short of an object position. Then, the workpiece 37 is moved toward the rotary grind stone 11 by an operating board, e.g., a touch panel. The position to be machined is taught by making the part of the workpiece 37 contact with the machining tool 11.

Figure 9:
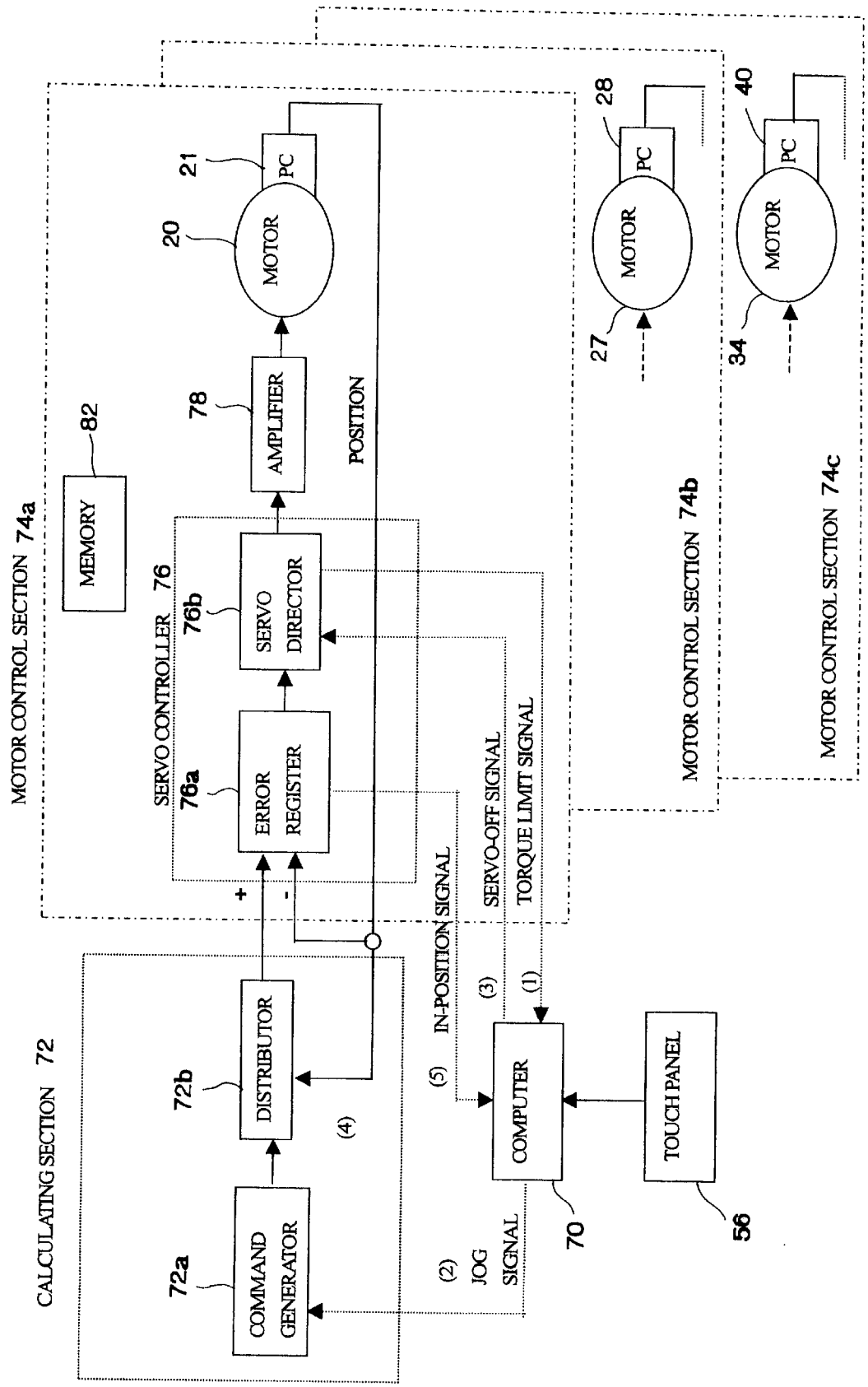
FIG. 9 is a block diagram of the finishing machine.

Firstly, the control unit 55 will be explained with reference to FIG. 9.

A computer 70 is a main element of the control unit 55.

A calculating section 72 includes a command generator 72a and a distributor 72b. The command generator 72a receives instructions from the computer 70, then generates commands for driving and stopping the first motor 20, the second motor 27 and the third motor 34, which respectively move the first arm 16, the second arm 26 and the lower member 31. The command generator 72a continuously calculates and outputs object angular positions of the motors 20, 27 and 34 in order.

The distributor 72b temporally stores the object angular positions of the motors 20, 27 and 34, which are sent from the command generator 72a, as a buffer, and distributes the object angular positions to each motor 20, 27 and 34 in inputted order.

Three motor control sections 74a, 74b and 74c are respectively provided to the first motor 2, the second motor 27 and the third motor 34.

Each motor control section 74a, 74b and 74c has the same structure, so only the motor control section 74a for the first motor 20 will be explained.

The motor control section 74a includes: a servo controller 76 constituted by an error register 76a and a servo director 76b; an amplifier 78; an encoder 21 provided to the first motor 20 and constituted by, for example, a pulse counter (PC); and a memory 82. Current limit values are stored in the memory 82. The current limit values may be inputted to the servo director 76b as limit values. Actually, an exciting current supplied to the motor 20 is greater while the first arm 16 is moved at high speed; the exciting current supplied to the motor 20 is smaller while the first arm 16 is moved at low speed. Therefore, in the case that the current limit value is fixed, the current limit value must be defined on the basis of the exciting current of the high speed operation, so it takes a long time to reach the current limit during the low speed operation and timing of turning off the exciting current must be delayed. Preferably, the current limit value is changed on the basis of operating speed of the first arm 16 or rotational speed of the motor 20 and inputted to the servo director 76b. In this case, the current limit values may be in proportion to the operating speed of the first arm 16 or the rotational speed of the motor 20.

The error register 76a compares the object position, which has been distributed by the distributor 72b and which is an angular position of a rotor of the first motor 20, with a present position (angular position) of the motor 20, then a rotational direction and a rotational angle of the motor 20 is calculated so as to make the difference between the object position and the present position zero. Next, the error register 76a makes control signals for canceling the difference, whose polarity is on the basis of the rotational direction, are sent to the servo director 76b. Further, the error register 76a outputs an in-position signal, which indicates that the first motor 20 reaches the object position, when the difference between the object position and the present position is within a prescribed range.

The servo director 76b receives the control signals from the error register 76a and generates the exciting current for driving the motor 20. The servo director 76b always compares the exciting current with the current limit value stored in the memory 82. If the exciting current is greater than the current limit value, the servo director 76 sends a torque limit signal to the computer 70. When a servo-off signal is sent from the computer 70, the servo director 76b compulsorily makes the exciting current zero.

The amplifier 78 amplifies the exciting current, which is outputted by the servo director 76b, to actually drive the first motor 20.

In the present embodiment, the encoder 21 of the first motor 20 counts number of pulses, which are sent from a pulse generator attached to the output shaft of the first motor 20, so as to detect the present angular position of the first arm 16, which is moved by the first motor 20, with respect to an initial angular position thereof. Note that, the present angular position may be detected by an absolute encoder. The present angular position of the first arm 16 detected by the encoder 21 is inputted to the distributor 72b and the error register 76a.

The structures of the motor control sections 74b, which includes the second motor 27 having an encoder 28, and the motor control sections 74c, which includes the third motor 34 having an encoder 40, are equal to that of the motor control section 74a, so their explanation will be omitted.

Figure 5A:
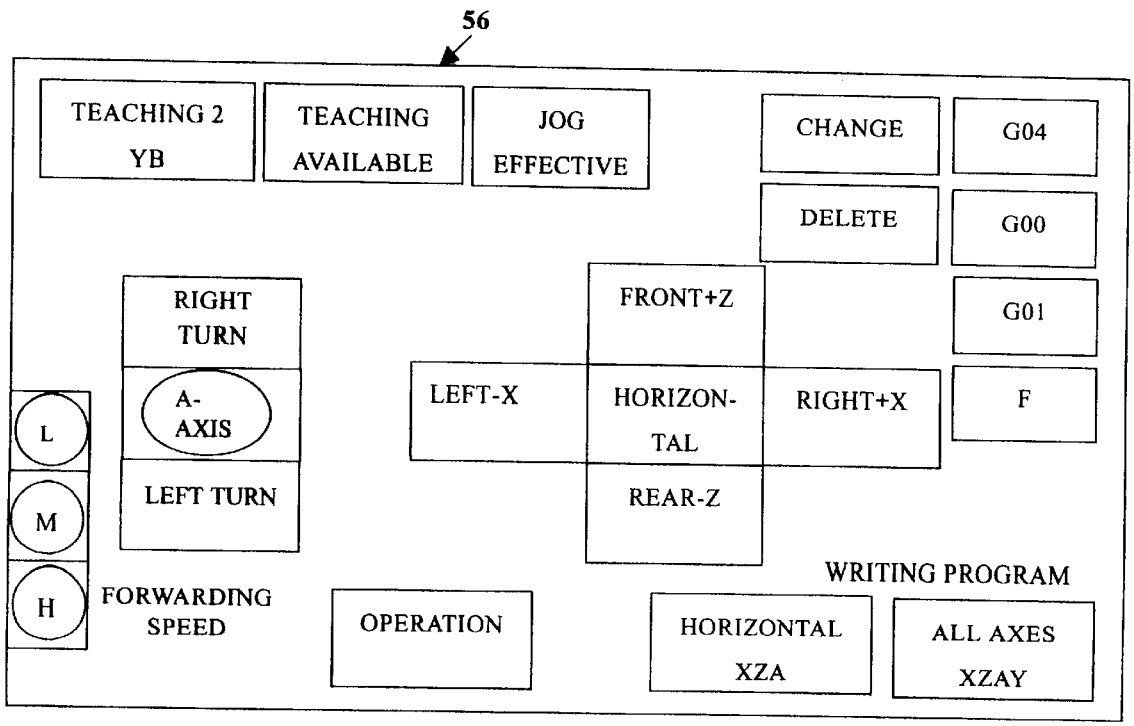
FIG. 5A is an explanation view of a screen of a teaching panel for moving a workpiece in a horizontal plane.
Figure 5B:
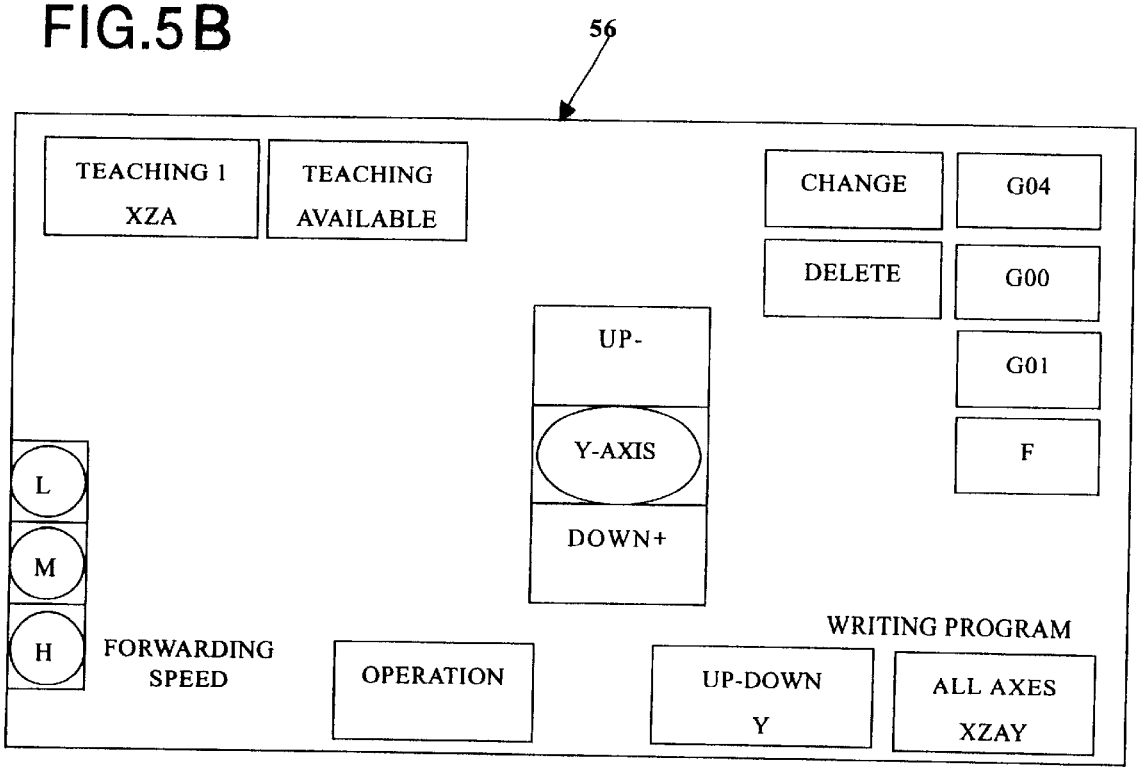
FIG. 5B is an explanation view of a screen of the teaching panel for moving the workpiece in a vertical plane.

A touch panel 56 acts as a teaching board. Moving directions of the work piece 37 and commands for moving and stopping can be inputted to the computer 70 by touch panel 56. FIG. 5A shows a screen of the touch panel 56, which is used when the workpiece 37 is moved in a horizontal plane by the motors 20, 27 and 34; FIG. 5B shows a screen of the touch panel 56, which is used when the work piece 37 is moved in a vertical plane by the first arm 16, which is driven by the motor 23.

Keys of the touch panel 56 will be explained.

By pushing a key "TEACHING 2 YB" shown in FIG. 5A, the screen shown in FIG. 5A is changed to the screen shown in FIG. 5B. On the other hand, by pushing a key "TEACH- ING 1 XZA" shown in FIG. 5B, the screen shown in FIG. 5B is changed to the screen shown in FIG. 5A.

By pushing keys "TEACHING AVAILABLE", the servo-off signal is sent from the computer 70, so that the exciting currents of the motors 20, 27 and 34 are turned off. Namely amount of servo is made zero. With this action, an operator can manually move the first arm 16, the second arm 26 and the lower member 31, so the operator can freely manually move the workpiece 37.

By pushing a key "JOG EFFECTIVE" shown in FIG. 5A, the computer 70 can send a jog signal to the calculating section 72 by pushing the keys "FRONT+Z", "REAR−Z", "LEFT−X" and "RIGHT+X" shown in FIG. 5A and the keys "UP−" and "DOWN+" shown in FIG. 5B. Namely, if the key "JOG EFFECTIVE" is not pushed, the workpiece 37 is not moved by the machine 10 even if the key "FRONT+Z", etc. are pushed, so that the operator can be safely protected.

Keys "G04", "G00", "G01" and "F" shown in FIGS. 5A and 5B are code selection keys.

If the key "G04" is pushed and a number standing for time length is inputted, execution of programs is temporally stopped for the inputted time length.

If the key "G00" and a key "WRITING PROGRAM" are pushed, the first arm 16, the second arm 26 and the lower member 31 are moved, at high speed, to sampling positions, which have been predetermined in a program or programs.

If the keys "G01" and "WRITING PROGRAM" are pushed, the sampling positions are logically linearly connected. With this action, the workpiece can be linearly moved between the sampling positions.

The key "F" assigns the moving speed of the workpiece 37 between the sampling positions, which have been logically linearly connected.

By pushing keys "RIGHT TURN" or "LEFT TURN", the exciting current is supplied to the third motor 34 to rotate the third motor 34 in the right or the left direction.

By pushing the keys "FRONT+Z", "REAR−Z", "LEFT−X" and "RIGHT+X", the exciting currents are supplied to the first motor 20, the second motor 27 and the third motor 34, so that actions of the first arm 16, the second arm 26 and the lower member 31 can be linked. The workpiece 37 can be linearly moved in the back-and-forth direction and the right- and-left direction without changing a heading of the workpiece 37.

By pushing the keys "UP−" and "DOWN+", the motor 23 is driven to move the first arm 16 in the vertical direction.

By pushing a key "L", "M" or "H" (meaning "low", "medium" and "high", respectively) shown in FIGS. 5A and 5B, moving speed of the work piece 37, which is moved by pushing the key "FRONT+", etc. can be defined.

By pushing a key "CHANGE" shown in FIGS. 5A and 5B, the teaching data can be replaced. By pushing a key "DELETE" shown in FIGS. 5A and 5B, the stored teaching data can be deleted.

By pushing a key "HORIZONTAL XZA" shown in FIG. 5A, data of horizontal movement of the teaching data can be stored or written as a program.

By pushing a key "UP−DOWN Y" shown in FIG. 5B, data of vertical movement of the teaching data can be stored or written as a program.

By pushing a key "ALL AXES XZAY" shown in FIGS. 5A and 5B, all of the teaching data (the data of the horizontal movement and the vertical movement) can be stored or written as a program.

By pushing a key "OPERATION" shown in FIGS. 5A and 5B, a manual operation key (not shown) is shown on the screen.

Next, an actual process of the teaching will be explained.

The workpiece (cast product) 37 is fixed to the holding unit 30.

Height of the part of the workpiece 37 to be machined (ground) is corresponded to that of the rotary grind stone 11 by vertically moving the first arm 16, which is vertically moved by using the keys "UP−" and "DOWN+" on the screen. The data of the height are defined on the basis of rotational angle of the ball screw 17, with respect to the initial standard position, which is measured by the encoder 25. Namely, the data of the height of the first arm 16 can be measured on the basis of screw pitch of the ball screw 17, which has been previously known, and the rotational angle thereof. The data of the height of the first arm 16 is stored in the memory by using the key "UP−DOWN Y" or "ALL AXES XZAY".

Figure 6:
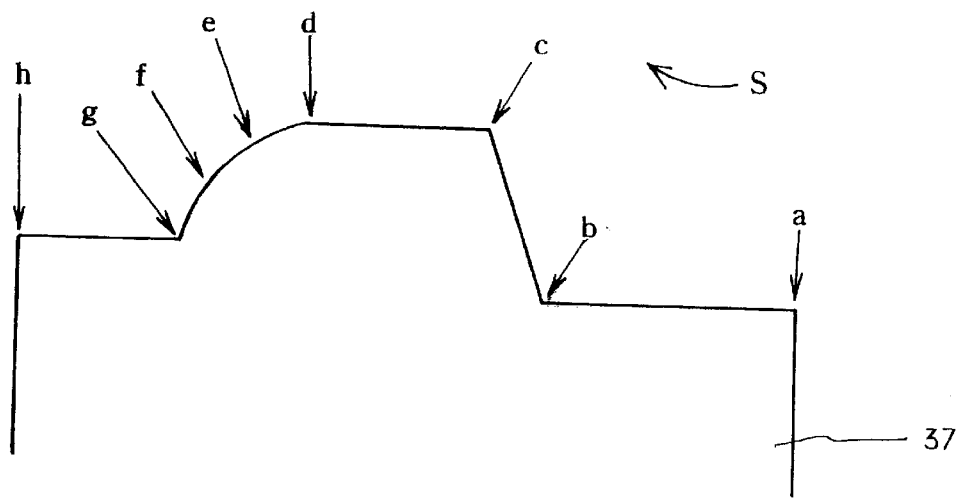
FIG. 6 is an explanation view of an example of a machining track.

Next, the workpiece 37 is moved by alternately.using the keys "TEACHING AVAILABLE" and "JOG EFFECTIVE" so as to move along a machining track "S" shown in FIG. 6. There are sampling points "a", "b", "c" ... on the machining track "S". The sampling points of the workpiece 37 are made contact with the rotary grind stone 11 in order, so that data are stored as the teaching data.

Figure 7A:
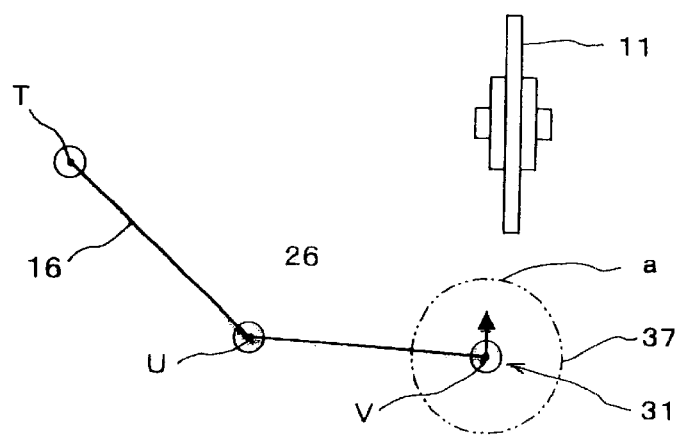
FIGS. 7A–7D are plan views showing steps of teaching a position of the work piece.
Figure 8A:
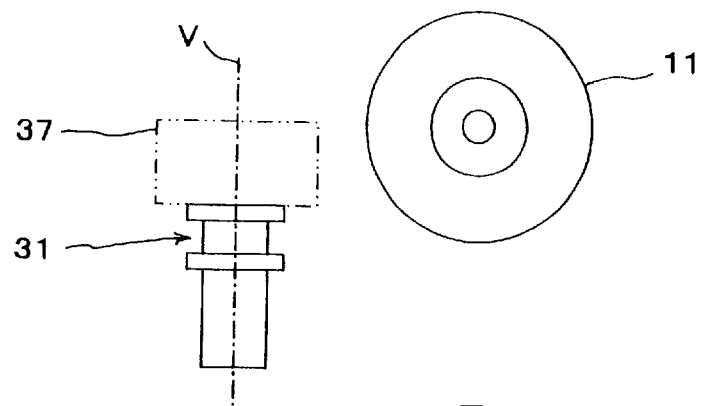
FIGS. 8A–8D are front views showing steps of teaching the position of the work piece.

Firstly, servo function of the motors 20, 27 and 34 are turned off by using the key "TEACHING AVAILABLE", then the part (sampling point) "a" is moved to a position short of an object position, at which the part "a" faces the rotary grind stone 11, by manually moving the arms 16 and 26, which are moved in the horizontal planes, and the lower member 31 (see FIGS. 7A and 8A). The first arm 16 can be turned, in the horizontal plane, about a first shaft (axis) "T"; the second arm 26 can be turned, in the horizontal plane, about a second shaft (axis) "U"; the lower member 31 (the holding unit 30) can be rotated about a vertical shaft. (axis) "U". With this structure, the workpiece 37 can be optionally moved in a horizontal plane.

Next, the key "JOG EFFECTIVE" is pushed so as to make the keys "FRONT+Z", etc. effective, then the workpiece 37 is moved to the object position by the keys for moving the workpiece, e.g., the key "FRONT+Z".

Namely, commands for moving the workpiece 37 toward the rotary grind stone 11 are inputted to the computer 70 by the keys for moving the workpiece, e.g., the key "FRONT+Z". Upon receiving the commands, the computer 70 sends a jog signal for moving the workpiece 37 toward the rotary grind stone 11 to the command generator 72a. Upon receiving the jog signal, the command generator 72a divides a linear distance between the part "a" of the workpiece 37 and the rotary grind stone 11 into a plurality of portions by a unit distance. Namely, length of each portion is equal to the unit distance. Then, the command generator 72a calculates. object positions of the motors 20, 27 and 34. The object positions are terminal points of the divided portions. The calculated object positions of the motors 20, 27 and 34 are sent to the motor control sections 74a, 74b and 74c, which respectively control the arms 16 and 26 and the lower member 31, via the distributor 72b.

In the motor control sections 74a, 74b and 74c, the present positions, which are detected by the encoders 21, 28 and 40, are respectively compared with the object positions by the error registers 76a, and control signals, which respectively correspond to the differences between the present positions and the object positions, are outputted. The servo directors 76b generate the exciting currents corresponding to the control signals. The exciting currents are respectively amplified, by the amplifiers 78, so as to drive the motors 20, 27 and 34. These actions are simultaneously executed in the motor control sections 74a, 74b and 74c. With these actions, the workpiece 37 can be linearly moved, toward the rotary grind stone 11, the unit distance in order.

Figure 7B:
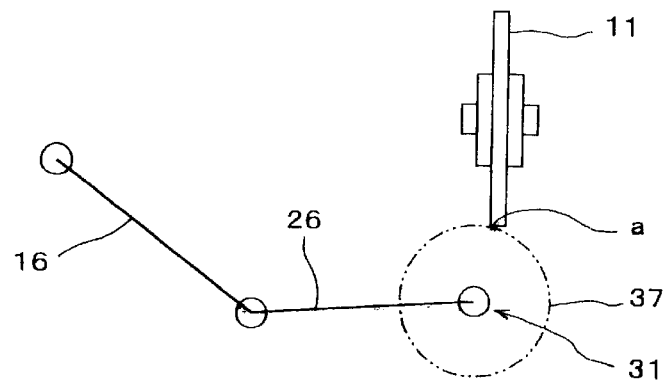
Figure 8B:
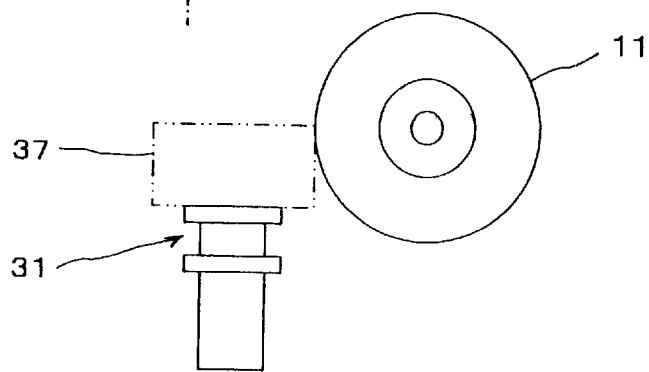

After a while, as shown in FIGS. 7B and 8B, the workpiece 37 contacts the rotary grind stone 11, but the motors 20, 27 and 34 further try to move the arms 16 and 26 and the lower member 31 so as to further move the workpiece 37 until at least one of the servo directors 76b of the motor control sections 74a, 74b and 74c detects that the exciting current is greater than the predetermined current limit value.

When at least one of the servo directors 76b of the motor control sections 74a, 74b and 74c detects that the exciting current is greater than the predetermined current limit value, the arms 16 and 26 are bent or deformed and the lower member 31 is inclined with respect to the second arm 26 and the vertical axis. If the teaching is executed in this state as well as the conventional method, the actual rotational positions of the motors 20, 27 and 34, which move the arms 16 and 26 and the lower member 31, detected by the encoders 21, 28 and 40 are shifted.

In the present embodiment, when at least one of the servo directors 76b of the motor control sections 74a, 74b and 74c detects that the exciting current is greater than the predetermined current limit value, the exciting currents are maintained the current limit value. Simultaneously, the servo director 76b sends a torque limit signal to the computer 70.

With this action, the workpiece 37, the arms 16 and 26 and the lower member 31 are not overloaded and not damaged.

Upon receiving the torque limit signal, the computer 70 stops sending the jog signal to the command generator 72a and sends a servo-off signal to all the servo directors 76b so as to compulsorily turn off the exciting currents.

Figure 7C:
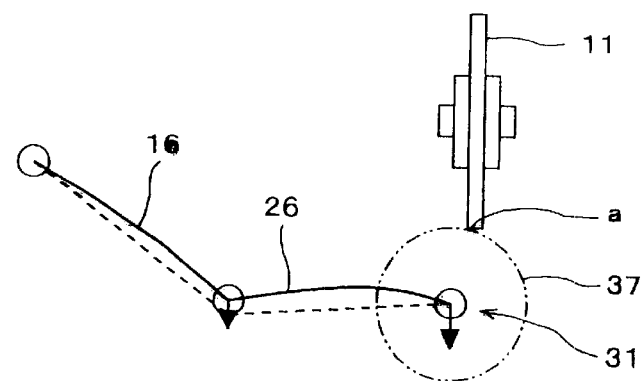
Figure 7D:
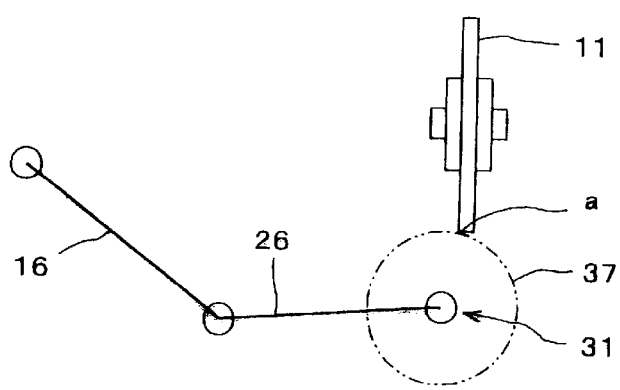
Figure 8C:
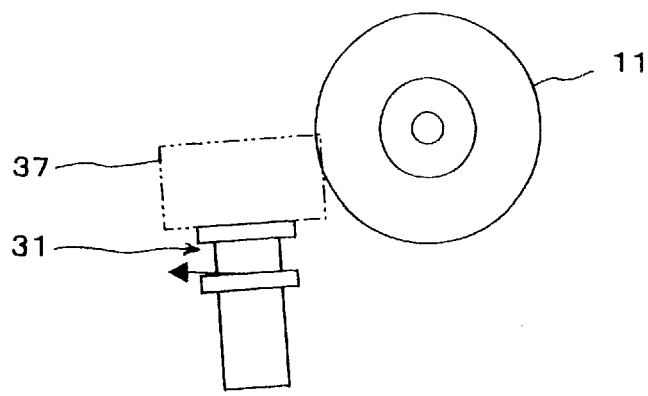
Figure 8D:
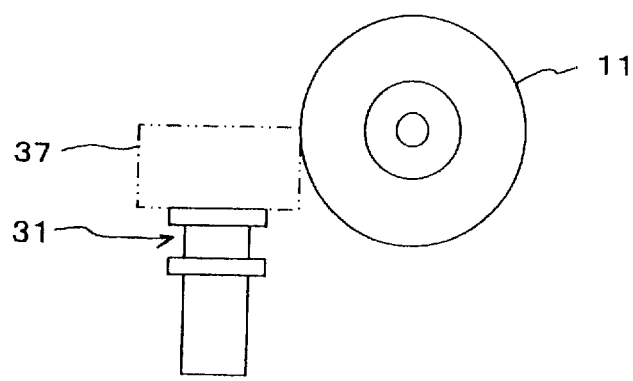

By turning off the exciting currents, all the motors 20, 27 and 34 are made free, so that a pressing force, which has been applied to the arms 16 and 26 and the lower member 31 so as to press the workpiece 37 to the rotary grind stone 11, is disappeared. Therefore, the arms 16 and 26 and the lower member 31 are returned from a state shown in FIGS. 7C and 8C to a state shown in FIGS. 7D and 8D, in which counter forces, which work from the rotary grind stone 11 to the arms 16 and 26 and the lower member 31, and frictional forces, which are generated in the arms 16 and 26 and the lower member 31, are balanced. In the state shown in FIGS. 7D and 8D too, the frictional forces generated in the arms 16 and 26 and the lower member 31 are applied to the workpiece 37 as elastic forces toward the rotary grind stone 11, so that the part "a" of the workpiece 37 contacts the rotary grind stone 11 with a proper pressing force.

The computer 70 reads the rotational positions of the motors 20, 27 and 34, which have been detected by the encoders 21, 28 and 40 and temporally stores the data as the object teaching position of the part "a" of the workpiece 37. Finally, the data are stored, as the programs, by pushing the key "HORIZONTAL XZA" or "ALL AXES XZAY" with the operator's finger.

The rotational positions of the motors 20, 27 and 34 are simultaneously inputted to the distributor 72b. Then, the distributor 72b outputs the rotational positions inputted as the object positions. With this action, two same data, which are the object position sent from the distributor 72b and the rotational position from the encoder 21, 28 or 40, are inputted to each error register 76b, so an in-position signal is sent from the error register 76b to the computer 70.

Upon receiving the in-position signal, the computer 70 stops sending the servo-off signal, so that the servo directors 76b can output the exciting currents. Then, the computer 70 waits for the next commands inputted from the touch panel 56. In this state, the teaching process of the part "a" of the workpiece 37 is completed.

Then, the data of the rotational positions, which correspond to other parts "b", "c", . . . (see FIG. 6), and setting data are stored in order, so that the machining track "S" on the workpiece 37 can be taught.

If the height of the workpiece 37 is partially changed, the data of height are changed by using the keys "UP–" and "DOWN+", so that positions of the parts "a", "b", . . . to be machined can be maintained with respect to the rotary grind stone 11.

In the above described embodiment, the workpiece 37 is moved in the three directions (X-axis, Y-axis and Z-axis) and rotated about the vertical axis (A-axis) of the holding unit 30, but the present invention is not limited to the embodiment. For example, three arms or more may be employed to move the workpiece 37 in a space.

Actually, in the finishing machine 10, the first arm 16, the second arm 26 and the holding unit 30 (the lower member 31) are respectively turned or rotated about the axes on the basis of polar-coordinate data; the operator operates the touch panel 56 under the rectangular coordinates (X-axis, Y-axis and Z-axis). Therefore, the computer 70 converts the rectangular-coordinate data into the polar-coordinate data.

In the present embodiment, the finishing machine 10 has been explained as an example of the machine executing the method of the present invention. The method of the present invention can be applied to many types of machines, e.g., cutting machines, polishing machines.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and range of equivalency of the claims are therefore intended to be embraced therein.

What is claimed is:

1. A method of teaching a position of a machining track in a machine comprising:
    a first arm turning in a first horizontal plane;
    a first motor for turning said first arm;
    a second arm provided to a front end of said first arm, said second arm turning in a second horizontal plane;
    a second motor for turning said second arm;
    a holding unit for holding a work piece, said holding unit provided to a front end of said second arm, said holding unit rotating about a vertical axis;
    a third motor for rotating said holding unit; and
    a control unit controlling said motors to turn and rotate said first arm, said second arm and said holding unit, said control unit moving the work piece to positions, which have been stored, so as to make a part of the work piece contact with a machining tool, said method comprising the steps of:
        driving said motors with detecting exciting currents, by said control unit, so as to move the work piece from a position short of an object position to the object position;
        making the work piece contact with the machining tool, which corresponds to the object position;

turning off the exciting currents of said all motors if at least one of the exciting currents, which respectively run through said motors, is greater than a predetermined value; and storing a position of the work piece as the object position after counter forces, which work from the machining tool to said arms and said motors, and frictional forces, which are generated in said arms and said motors, are balanced after the exciting currents are turned off and the work piece is in contact with the machining tool.

2. The method of claim 1 wherein the predetermined value is fixed and defined by an exciting current at high speed operation of at least one of said first, second and third motors.

3. The method of claim 1 wherein the predetermined value is fixed and defined by an exciting current at high speed operation said first motor.

4. The method of claim 1 wherein the predetermined value is based on a speed of operation of at least one of said first, second and third motors.

5. The method of claim 1 wherein the predetermined value is based on a speed of operation of said first motor.

6. A method of teaching an object position of a machining track of a workpiece relative to a machine tool, in a robotic device driven by at least one motor:

disposing the workpiece in the robotic device for positioning relative said machine tool by action of said at least one motor;

monitoring a level of an exciting current driving said at least one motor;

driving said at least one motor to effect relative positioning of said workpiece and said machine tool such that said workpiece and said machine tool come into contact with increasing force;

comparing said level of said exciting current with a current limit value while said workpiece and said machine tool are contacting with increasing force;

ceasing supply of said exciting current when said level of said exciting current reaches said current limit value;

allowing deflection of said robotic device, resulting from said forceful contact of said machine tool and said workpiece, to dissipate and forces balance after said ceasing of supply of said exciting current which removes torque applied by said at least one motor;

measuring a positioning of said robotic device after said allowing said deflection to dissipate; and storing said positioning as said object position.

7. The method of claim 6 wherein said current limit value is fixed and defined by an exciting current at high speed operation of said at least one motor.

8. The method of claim 6 wherein the current limit value is based on a speed of operation of said at least one motor.

* * * * *